UNITED STATES PATENT OFFICE.

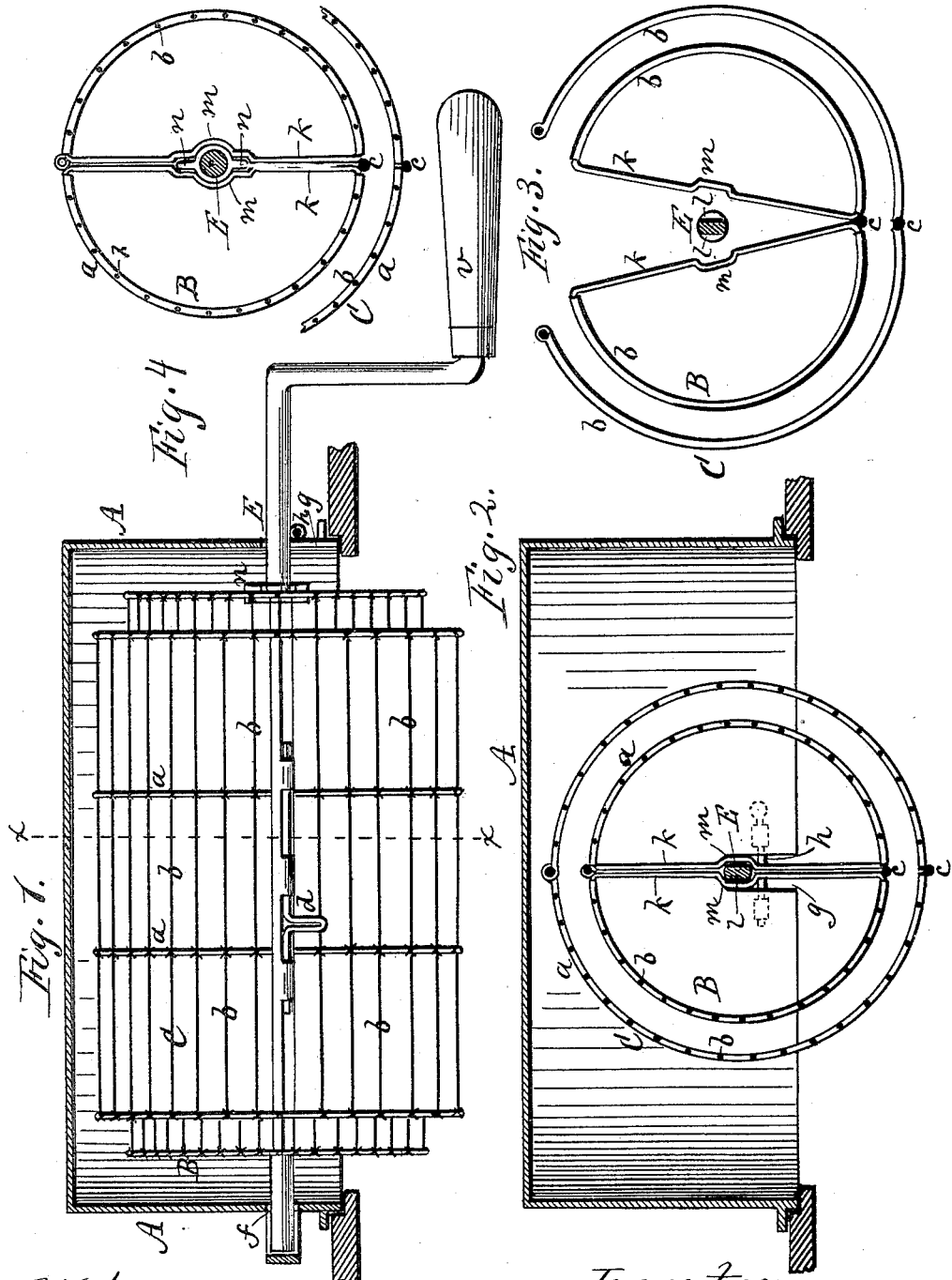

WILLIAM P. RANDALL, OF LE ROY, NEW YORK, ASSIGNOR, BY MESNE ASSIGNMENTS, TO ELIZABETH RANDALL, OF SAME PLACE.

BROILER.

SPECIFICATION forming part of Letters Patent No. 419,159, dated January 7, 1890.

Application filed October 28, 1889. Serial No. 328,424. (No model.)

*To all whom it may concern:*

Be it known that I, WILLIAM P. RANDALL, of Le Roy, in the county of Genesee and State of New York, have invented a certain new and useful Improvement in Broilers; and I do hereby declare that the following is a full, clear, and exact description of the same, reference being had to the drawings accompanying this specie.

My improvement relates to that class of meat-broilers in which two revolving open-ended cylinders, between which the meat is wrapped, are placed in a box or receptacle over the boiler-hole of the stove, the whole so arranged that the heat has free access outside and inside the cylinders, thus cooking both sides of the meat at once.

The invention consists in the construction and arrangement of parts hereinafter described and claimed.

In the drawings, Figure 1 is a cross-section of the cover or box located over the boiler-hole of the stove, and a side elevation of the perforated cylinders inside the box. Fig. 2 is a vertical cross-section through the cover and the perforated cylinders in line $x\ x$ of Fig. 1. Fig. 3 is a diagram showing an end view of the two perforated cylinders partially open and a cross-section of the shaft. Fig. 4 is a similar view, parts being broken away.

A indicates the cover or box, which is placed over the boiler-hole of the stove. This cover is of cylindrical form and has a closed top and sides, but an open bottom, to allow the heat to enter and rise to the top, forming a heated-air chamber around cylinders. It is of sufficient height to enable the broiling-cylinders to rest therein and allow the proper circulation of heat.

B and C are the two interior broiling-cylinders, made, preferably, of a series of rings $a\ a$, with cross-wire connections $b\ b$, as shown, but can be made of perforated sheet metal. Each of these cylinders is made in halves hinged on one side, as shown at $c$, so that the cylinders can be thrown open, as indicated in Fig. 3. When the cylinders are closed, they are locked and held in position by a locking-catch $d$, or any equivalent arrangement. An annular space is left between the outer and inner cylinders sufficient to receive the meat which is to be cooked. The inner cylinder is longer than the outer one and projects at both ends, as shown. This of course is to provide against coming in contact with the sides of the broiling-hole, the cylinders being held partially below the level of top of the stove, and also to provide a sure entrance of heated air through the center of the inner cylinder.

E is the shaft by which the cylinders are turned. The shaft is attached to the cover by one end being inserted through a hole $f$ in one side of the cover and the other end being passed bodily into an open slot $g$ in the other side of the cover and held by a locking-pin $h$. This insures ready insertion and removal. It has on one end a crank $v$, by which it is rotated.

The cylinders are attached to and removed from the shaft by the following means: At the ends the inner cylinder B is provided with cross-wires $k\ k$, one attached to each half of the cylinder, and in the center of the cross-wires are half-sockets $m\ m$, Fig. 3, formed by bending the wires and designed to fit around the shaft E. The shaft at the end farthest from the crank is notched or slotted on opposite sides, as shown at $l$, Fig. 3, making the shaft square or rectangular in cross-section at that point. When the inner cylinder B is closed and fastened, the half-sockets $m\ m$ of the cross-wires at that end enter the notches and embrace the square part of the shaft, thus fastening the cylinder to the shaft, so that it must revolve with the shaft, and preventing end movement thereon. The cross-wires at the other end of the inner cylinder embrace a lug $n$, fixed on the shaft, and furnish a large bearing to hold the cylinder in position. By the means above described the inner cylinder can be readily attached to and detached from the shaft, enabling the cylinder to be removed for cleaning or other purposes.

The outer cylinder C is not attached to the shaft, but forms simply a wrapper or holder. The meat to be cooked is placed around the inner cylinder, and the hinged outer cylinder is then wrapped around it and secured in the manner before described. The meat is thus inclosed in the annular space between the two cylinders and clamped fast in place. The cover is placed over the fire and the shaft revolved, which brings all parts of the surface to the fire. The heat also ascends into the cover and passes in at the ends of the inner cylinder and cooks the inside as well as the outside of the meat. No smoke or offensive odors can escape into the room, as they are all shut off and pass back through the flue of the stove.

By cooking both sides of the meat at once the surfaces are seared and the juices are all retained, while it takes only half the time to cook both sides of the meat that it takes to cook both sides separately or one after the other.

It is the design in this invention to make the cover or box A closed and without a lid at the top, as it thereby has no joints to allow the escape of smoke or offensive odors, and to do this I employ a peculiar means for attaching the inner cylinder, whereby the parts can be connected with and removed from the box, as before described. In other gridirons the top of the box is open and has a hinged cover.

Having described my invention, what I claim as new, and desire to secure by Letters Patent, is—

1. In a broiler, the cylinder B, made in halves hinged together and provided with cross-wires $k\ k$, having half-sockets $m\ m$, in combination with the shaft E, provided at one end with the notch $l$ and at the other end with the lug $n$, said half-sockets embracing the notch and lug, as shown and described, and for the purpose specified.

2. In a broiler, the combination of the closed cover A, the shaft E, resting therein, provided at one end with a notch $l$ and at the other with a lug $n$, the interior cylinder B, provided with cross-wires having half-sockets embracing the shaft, and the exterior hinged cylinder C, inclosing the inner cylinder, as herein shown and described.

In witness whereof I have hereunto signed my name in the presence of two subscribing witnesses.

WM. P. RANDALL.

Witnesses:
R. F. OSGOOD,
WM. J. MCPHERSON.